United States Patent [19]
Dick

[11] 3,912,598
[45] Oct. 14, 1975

[54] WASTE MANAGEMENT SYSTEM
[76] Inventor: H. Douglas Dick, 1951 Port Locksleigh Place, Newport Beach, Calif. 92660
[22] Filed: May 23, 1973
[21] Appl. No.: 362,963

[52] U.S. Cl. ................ 202/185; 202/197; 202/200; 210/50; 210/71; 203/DIG. 5; 159/1 RW; 4/131; 4/10
[51] Int. Cl.² .................... B01D 3/00; B01D 5/00; B01D 35/18; A47K 11/02
[58] Field of Search.......... 159/1 RW, 29; 71/14, 25; 210/1, 2, 50, 71; 201/2.5, 21, 25; 23/259.1; 208/9, 10; 202/197, 200, 185; 203/100, DIG. 5; 4/131, 10; 110/9, 9 E; 252/359 CG

[56] References Cited
UNITED STATES PATENTS

| | | | |
|---|---|---|---|
| 2,373,803 | 4/1945 | Baker et al. ...................... | 201/25 X |
| 3,020,559 | 2/1962 | Blankenship et al. | 4;110/131;9 E UX |
| 3,074,199 | 1/1963 | Johnson et al. .......... | 122/359 CG X |
| 3,304,991 | 2/1967 | Greenfield....... | 159/13 A;1 RW UX |
| 3,362,887 | 1/1968 | Rodgers.......................... | 210/215 X |
| 3,474,468 | 10/1969 | Blankenship........................... | 4/131 |
| 3,729,042 | 4/1973 | Burnett........................ | 159/1 RW X |
| 3,733,617 | 5/1973 | Bennett............................... | 4/131 X |

*Primary Examiner*—Jack Sofer
*Attorney, Agent, or Firm*—Harvey C. Nienow

[57] ABSTRACT

The present invention relates to a waste-management system; and more particularly to such a system that produces potable water. The disclosed waste-management system is adapted to be compacted to a size that fits onto a manually movable cart, or to be expanded to a size adapted to treat domestic and/or industrial waste. The overall system uses safe temperatures and pressures; and may therefor be utilized in many locations previously unavailable for such purposes.

3 Claims, 7 Drawing Figures

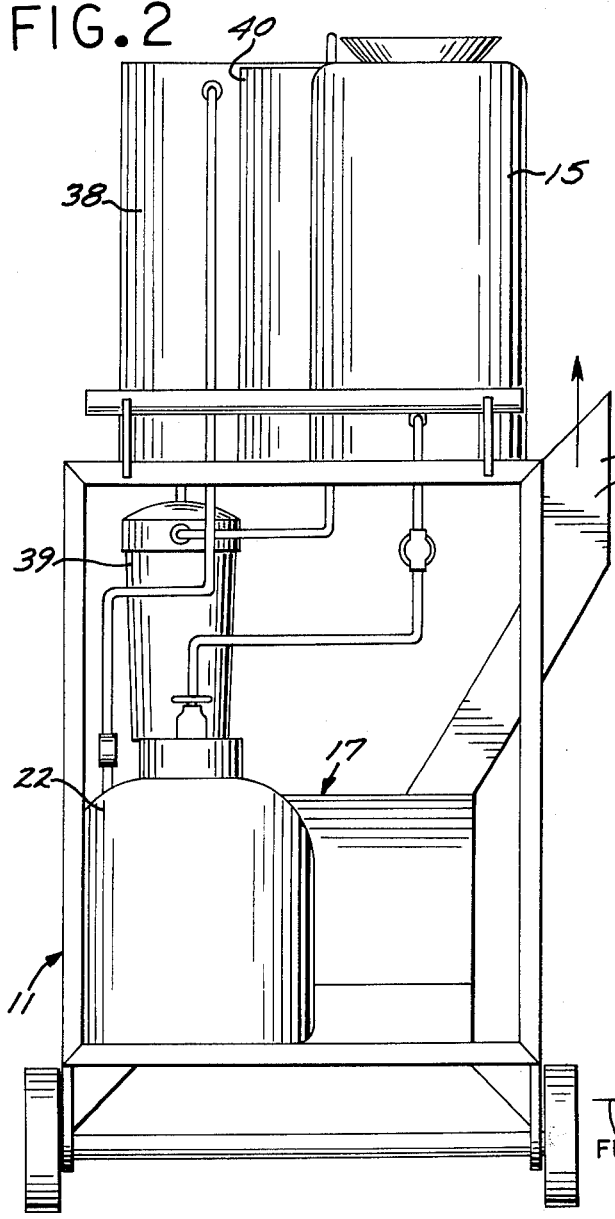
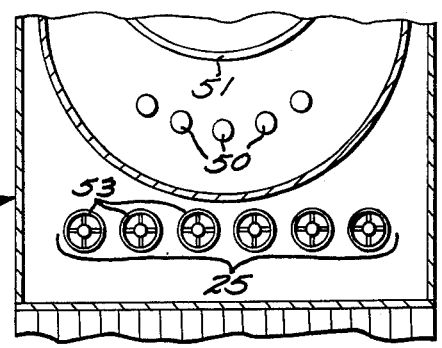
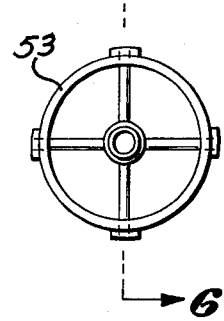
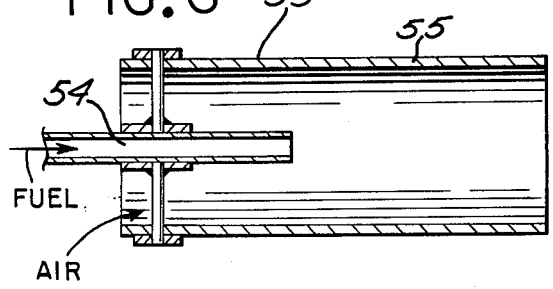
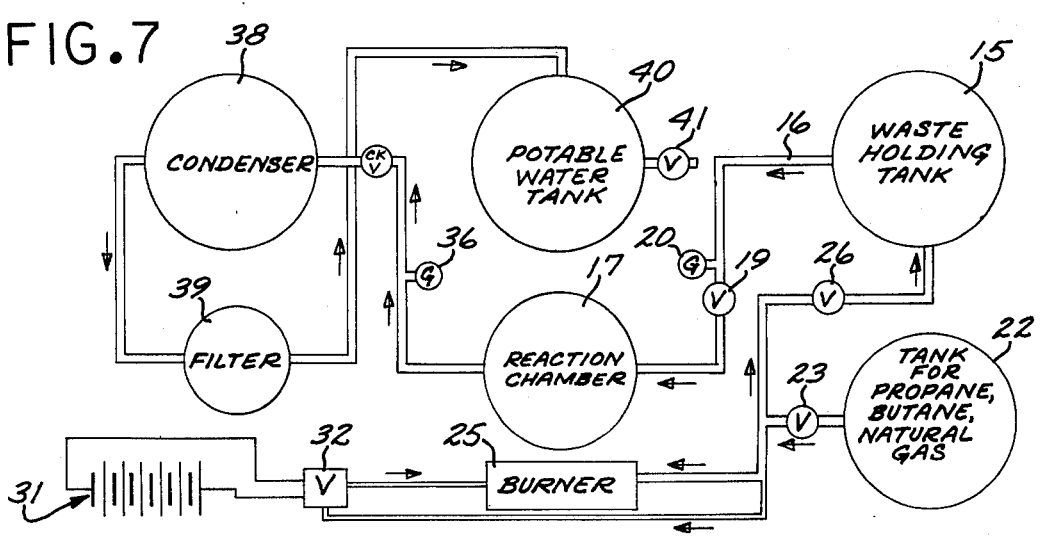

WASTE MANAGEMENT SYSTEM

BACKGROUND

It is well known that disposal of domestic and industrial waste is becoming a progressively worse problem— because the wastes are accumulating at an ever-increasing rate, and can no longer be dumped into lakes, rivers, or the oceans. As a result, a number of different systems have been suggested for "managing" this waste. Unfortunately, most prior-art systems have been bulky, complex, and frequently dangerous because of their extremely high temperatures and pressures.

It is therefore apparent that an improved waste-management system is needed.

OBJECTIVES

It is therefore the principal objective of the present invention to provide an improved waste-management system.

It is another objective of the present invention to provide an improved waste-management system that is much safer.

It is another objective of the present invention to provide an improved waste-management system that is relatively compact.

It is a further objective of the present invention to provide an improved waste-management system that operates at relatively-low temperatures and pressures.

It is a still further objective of the present invention to provide an improved waste-management system that provides potable water for reuse.

The attainment of these objectives and others will be realized from a study of the following description, taken in conjuction with the drawings of which FIG. 1 shows a pictorial front view of a waste-management system that is compact enough to be mounted on a cart. FIG. 2 shows a side view of the waste-management system previously illustrated in FIG. 1.

FIG. 4 shows a transverse cross-sectional view of the reaction chamber of the disclosed waste-management system.

FIG. 5 shows a front view of one of the heat-producing burners.

FIG. 6 shows a longitudinal cross-sectional view of the burner.

FIG. 7 shows a schematic representation of the disclosed waste-management system.

SYNOPSIS

Broadly speaking, the disclosed waste-management system comprises a waste-holding tank from which the waste is directed to a reaction-chamber, wherein the waste is converted to vapors. The water-vapor is salvaged; and is converted to purified potable water.

INTRODUCTION

It has been found that practically all domestic waste, and most industrial waste, may comprise a "suspension" wherein waste materials (such as food remnants, cleaning tissues, soaps, detergents, etc.) are suspended in a liquid. Suspensions such as these may be forced to flow through suitable piping to functional chambers, tanks, and the like; and therefore such suspensions are susceptible to treatment.

It has been found that one of the most successful treatments has been to "oxidize" the waste materials— i.e., force them to combine with oxygen or with the oxygen normally contained in the air. When this oxidation treatment proceeds to its ultimate conclusion, the resultant products are primarily water ($H_2O$) and carbon dioxide ($CO_2$) — accompanied by carbon monoxide (CO) and various amounts of impurities.

As indicated above, many prior-art treatments require extremely-high temperatures and pressures in order to provide satisfactory management of the waste.

The Waste-Management System (I)

Figure 1:
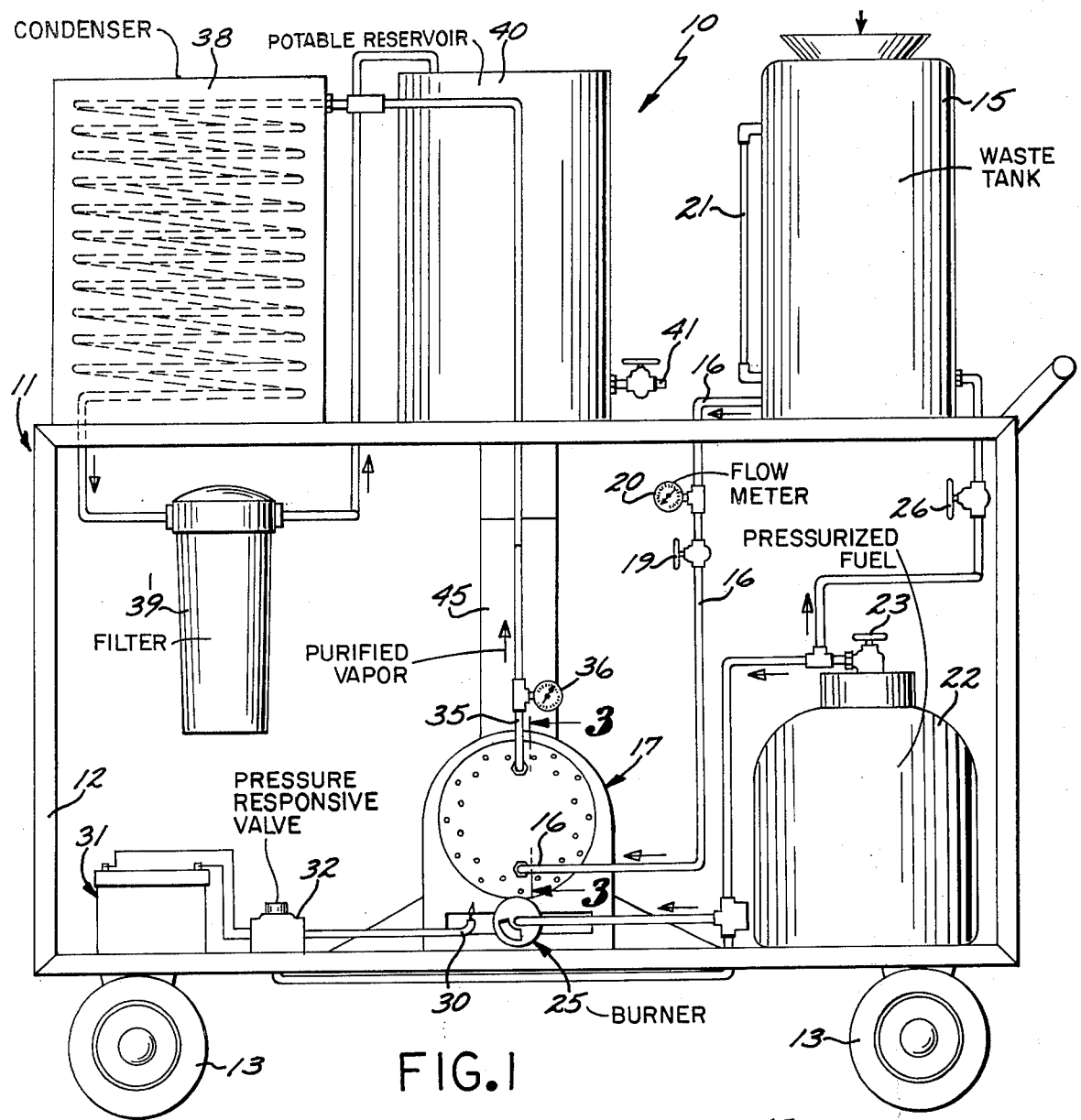

The present invention will be understood by first referring to FIG. 1, which shows a pictorial view of the apparatus of the present waste-management system. While the apparatus of FIG. 1 is illustrated as being mounted on a manually movable cart, in order that it may be mated with a modular bathroom to form a complete waste-management system, the disclosed waste-management system may be used for large-volume operations such as are required for an industrial plant, for the treatment of brackish water, and the like.

The Waste Sub-System

FIG. 1 shows a pictorial front view of the disclosed waste-management system 10 as mounted on a hand cart 11 having a frame 12 and a plurality of wheels 13 that permit the system to be moved to any desired location.

The waste is placed into a waste-holding tank 15, illustrated as having a funnel-shaped top for faciliting the placement of the waste; but it will be realized that in a permanent installation, a fixedly-positioned input waste pipe would be used. Waste-tank 15 has, near its lower end, an outlet waste-pipe 16 that permits a flow of the waste to a reaction-chamber 17 which will later be discussed more fully. The volume of the flow may be controlled by means such as a waste-flow valve 19, and may be monitored by a waste-flow gauge 20. Under those conditions when it is deemed advisable, a macerater (not shown) and a pump may be used to convert the waste suspension to a more homogeneous flowable slurry.

A waste-tank sight-tube 21 may be provided if so desired.

Heater Sub-System

FIG. 1 shows the waste-management system 10 to comprise a heater sub-system; the illustration showing a tank 22 that serves as a source of pressurized fuel-gas such as Propane, Butane, natural gas, or the like. Obviously, in a permanent installation, the fuel gas would be piped in, rather than being supplied from a tank. The fuel-gas from tank 22 traverses a shut-off valve 23; and is then applied to a burner-unit 25 of the reaction-chamber 17. The burner-unit 25 and its relation to the reaction-chamber 17 will be discussed later. If desired, a portion of the pressurized fuel-gas in the fuel-tank 22 may also be applied through a pressure control valve 26 to the waste-holding tank 15; in this way providing a force, in addition to the force of gravity and the pump (if used), for promoting the flow of the waste material to the reaction-chamber 17.

In many cases it is desired or required that the heater sub-system be provided with a safety system for controlling the pilot-light 30 that forms part of the heating sub-system. For example, FIG. 1 shows a battery 31 or other electrical source being used to control an electromechanical pilot-valve 32; the pilot-valve being connected to the fuel-tank 22 to respond to fuel pressure; and being connected (not shown) to other safety devices, such as a thermometer that senses the temperature of the burner-unit, etc.

Thus, under predetermined conditions, the waste is permitted to flow from the waste-holding tank 15 at a controlled volume and pressure to reaction-chamber 17; and simultaneously the burner-unit 25 is ignited to produce a desired amount of heat.

The Reaction Chamber (I)

It is possible to convert most of the waste material to vapor-products; and this is accomplished in the reaction-chamber 17. Here, the heat produced by the burner-unit 25 causes the waste material to vaporize; the vaporization-products comprising water-vapor and impurity-vapors. It will be shown later that the combustion products resulting from the fuel-gas combustion may be restricted to, and discharged from, a separate heater chamber; so that the combustion products do not mingle with the vaporization products, thus optimizing water-recovery.

Alternatively, the reaction-chamber may be constructed such that the waste vapor and fuel combustion products were mixed; so that the water vapor may or may not be recovered, depending on the requirements of the situation.

As indicated above, the vaporization products are primarily water-vapor — which is to be recovered — and impurity vapors that tend to give the recovered water, when it is recovered, an undesirable taste, odor, color, etc. It has been found that these impurity-vapors may be readily removed or converted; one technique utilizing a process known as "catalytic oxidation" which uses various materials known as "catalysts". This latter term means that the catalyst material aids in the process, but is not itself consumed — so that it may be re-used, often without any particular recovery processing. The catalytic-oxidation process and catalytic-materials used therein are well-known; and are discussed in many publications, as for example U.S. Pat. No. 3,487,016 issued to Jack D. Zeff on Dec. 30, 1969.

The present invention uses the above-discussed catalytic-oxidation process in reaction-chamber 17; the previously discussed vaporization-products produced therein being directed to a catalytic "bed" wherein the water-vapor is purified by having substantially all of the impurity-vapors removed or converted and removed by the catalytic material and process. The result is that substantially pure water-vapor is discharged from the reaction-chamber 17 through a water-vapor outflow tube 35 — a pressure gauge 36 being used to monitor the pressure therein.

The Water-Purifier Sub-System

As indicated in FIG. 1, the purified water-vapor is then directed from reactor-chamber 17 to a condenser 38 that condenses the water-vapor to liquid water. The liquid water may be directed from condenser 38 to a filter 39 (charcoal, bacterial, or the like) for further purification of the water if it is deemed necessary.

The now-purified liquid water is directed to a potable-water holding tank 40, from which it may be drawn off through a suitable outlet 41.

Whereas the invention has been discussed in terms of a small portable system that may produce about fifty gallons per hour, it is obvious that the disclosed principles and apparatus may be readily adapted for large-scale operation.

The Waste-Management System (II)

Attention is now directed to FIG. 2, which shows a pictorial side view of the apparatus previously discussed; this illustration showing, in addition, a flue 45 used for discharging the combustion-products from the reaction chamber 17.

The Reaction Chamber (II)

Figure 3:
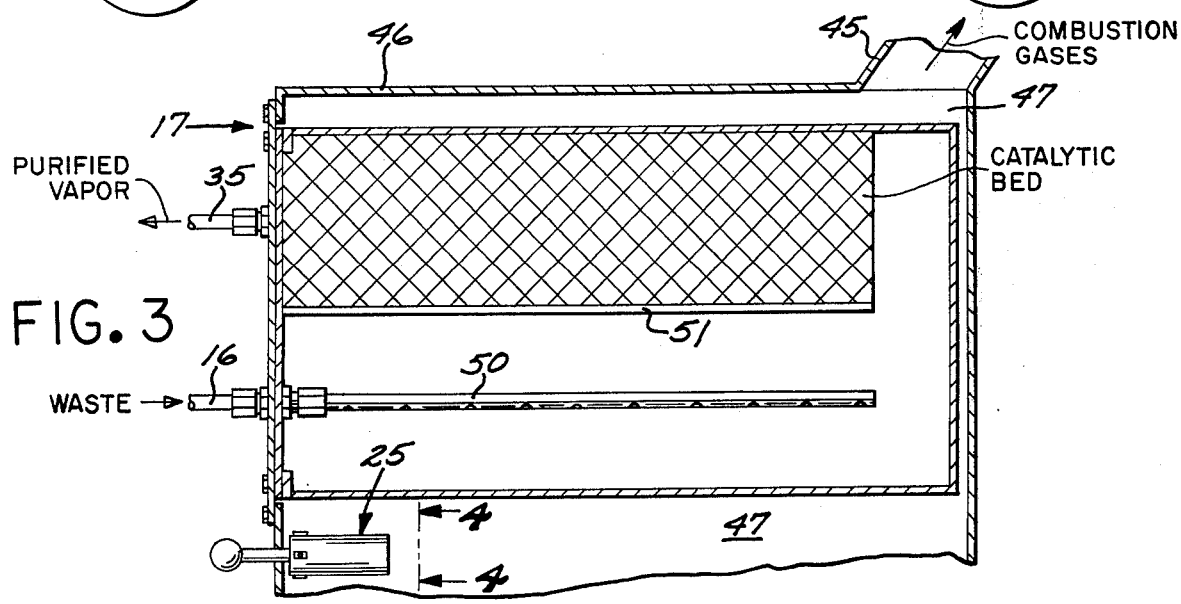
FIG. 3 shows a longitudinal cross-sectional view of the "reaction" chamber of the disclosed waste-management system.

FIG. 3 shows a longitudinal cross-sectional view of the reaction chamber 17; this chamber comprising an outer shell 46 that may be assembled by welding, bolting, or the like. The lower portion of the reaction chamber 17 contains the burner-unit 25 for producing the vaporizing-heat; the combustion-products from burner-unit 25 being confined to a heater-chamber 47 and then being discharged through flue 45.

FIG. 3 also shows the waste-outlet pipe 16 as being connected to one of a plurality of waste-flow nozzles 50; so that the waste flows from the waste-holding tank to the waste-nozzle 50, where it is exposed to the vaporizing-heat of the burner-unit 25. Excess oxygen may be provided to assure more complete oxidation, so that minimal amounts of carbon-monoxide will be produced. As the waste flows from nozzle 50, it is vaporized; and the vaporization-products are then carried into a catalytic bed 51 that comprises a perforated container holding a catalytic material. Here the above-discussed purification takes place; and the purified water-vapor flows through the water-vapor output pipe 35, to the condenser 38, as discussed above.

In those instances when a plurality of reaction chambers are deemed necessary they can be readily added in either parallel or series installation.

The catalytic material may be changed as needed; may be regenerated at a central location; or may be regenerated by operating the apparatus without waste-material, and in an atmosphere deficient of air.

Non-combustible waste materials are retained as ash to be removed later but are not vented from the apparatus.

The Burner Unit

FIG. 4 shows an internal end-on view of the lower portion of the reaction-chamber 17; showing the burner-unit 25 to comprise a plurality of individual burners 53; showing the lower edge of the catalytic bed 51; and showing a plurality of waste-flow nozzles 50.

The Burners

FIG. 5 shows an end view of one of the individual burners 53 of burner-unit 25; and FIG. 6 shows a longitudinal cross-sectional view of an individual burner 53, indicating that it comprises a fuel-gas nozzle 54 and a surrounding air-tube 55 that provides air and space for the combustion of the fuel-gas.

FIG. 7 shows an schematic drawing of the overall waste-management system; this drawing corresponding to the pictorial views of FIGS. 1 and 2.

What is claimed is:

1. A waste management system comprising:
a waste-holding tank
a container for pressurized fuel-gas;
means for pressurizing said waste-holding tank;
said pressurizing means comprising said container and conduit means between said waste-holding tank and said container;

a reaction-chamber having an outer shell comprising means dividing the interior thereof into upper and lower separated chambers;

said reaction-chamber further including a burner-unit in said lower chamber, at least one waste-discharge nozzle in said upper chamber connected to said waste-holding tank and discharging into said reaction-chamber, and catalytic purifying means within said upper chamber immediately above said waste-discharge nozzle having catalytic material to be contacted by the vapor products which result at the waste-discharge nozzle as said burner-unit heats said upper chamber;

conduit means connecting said burner-unit to said container;

conduit means connecting said waste-discharge nozzle to said waste-holding tank;

means for igniting the said fuel-gas at said burner-unit;

flue means for containing and discharging the combustion products resulting from the combustion of said fuel-gas without mingling the combustion products with the vaporization products;

means for condensing said vaporization products to liquid water;

means for further purifying said water by filtration;

a potable water tank; and conduit means for directing said vaporization products from said catalytic purifying means through said condensing means and filtration means to said potable water tank.

2. The invention of claim 1 including a manually movable cart having said waste-management system mounted thereon.

3. A waste-management system comprising:

a waste-holding tank;

a container for pressurized fuel-gas;

means for pressurizing said waste-holding tank;

said pressurizing means comprising said container and conduit means between said waste-holding tank and said container;

a reaction-chamber having an outer shell comprising means dividing the interior thereof into upper and lower separated chambers;

said reaction-chamber further including a burner-unit in said lower chamber, at least one waste-discharge nozzle in said upper chamber connected to said waste-holding tank and discharging into said reaction-chamber, and catalytic purifying means within said upper chamber immediately above said waste-discharge nozzle having catalytic material to be contacted by the vapor products which result at the waste-discharge nozzle as said burner-unit heats said upper chamber;

conduit means connecting said burner-unit to said container;

conduit means connecting said waste-discharge nozzle to said waste-holding tank;

means for igniting the said fuel-gas at said burner-unit;

said igniting means comprising a pilot light and controls therefor;

flue means for containing and discharging the combustion products resulting from the combustion of said fuel-gas without mingling the combustion products with the vaporization products;

means for condensing said vaporization products to liquid water;

means for further purifying said water by filtration;

a potable water tank; and conduit means for directing said vaporization products from said catalytic purifying means through said condensing means and filtration means to said potable water tank.

* * * * *